United States Patent [19]

Stöllinger

[11] Patent Number: 4,744,431
[45] Date of Patent: May 17, 1988

[54] ENDLESS TREAD CHASSIS FOR FULL-TRACK VEHICLES

[75] Inventor: Wolfgang Stöllinger, Knittelfeld, Austria

[73] Assignee: Voest-Alpine Aktiengesellschaft, Linz, Austria

[21] Appl. No.: 860,181

[22] Filed: May 6, 1986

[30] Foreign Application Priority Data

May 6, 1985 [AT] Austria .................................. 1347/85

[51] Int. Cl.⁴ .............................................. B62D 55/00
[52] U.S. Cl. .................................... 180/9.5; 29/426.5; 29/526 R; 280/111; 305/28; 384/420; 384/443
[58] Field of Search ..................... 180/9, 9.1, 9.21, 9.5; 280/111; 384/143, 420, 443; 305/38, 28; 29/526 R, 426.5

[56] References Cited

U.S. PATENT DOCUMENTS

| 1,222,335 | 4/1917 | Smith | 305/28 |
| 2,418,610 | 4/1947 | Webb | 305/28 |
| 3,910,367 | 10/1975 | Drone et al. | 180/9.5 |
| 4,373,739 | 2/1983 | Klem | 280/111 |
| 4,445,582 | 5/1984 | Andersson | 180/9.5 |

*Primary Examiner*—John J. Love
*Assistant Examiner*—Mitchell J. Hill
*Attorney, Agent, or Firm*—Cushman, Darby & Cushman

[57] ABSTRACT

The caterpillar chassis of a mining machine or loading machine has rocker arms 7, 9 being swivellably linked on a caterpillar carrier 2 and having rotatably supported thereon running rollers 8. At least one bearing bracket 5 for the swivel axis 6 of the rocker arms 7 is detachably connected with the caterpillar carrier 2 (FIG. 1).

2 Claims, 3 Drawing Sheets

4,744,431

ENDLESS TREAD CHASSIS FOR FULL-TRACK VEHICLES

BACKGROUND OF THE INVENTION

1. Field of the Invention

The invention refers to an endless tread chassis for full-track vehicles, in particular mining machines and loading machines, comprising rocker arms swivellably linked to the endless tread carrier and bearingly supporting rollers for the endless tread links.

2. Description of the Prior Art

In particular in connection with heavy duty vehicles such as bucket-wheel excavators, heavy duty loading machines as well as cutting machines, it is known to provide endless tread chassis having their endless tread or chain links, respectively, supported on rocker arms by means of frequently two or four supporting rollers. If there are provided four supporting rollers, pairs of supporting rollers are supported with interposition of a further rocker arm on a common rocker arm being swivellably linked to the endless tread carrier. With known constructions of such endless tread chassis, the endless tread chain had to be opened or the endless tread links had to be separated one from the other for dismounting the rocker arm in case of necessary maintainance work on the bearing means, in particular in case of fracture or bearing deficiency.

SUMMARY OF THE INVENTION

The invention now aims at providing the possibility to dismount dual wheel rocker arms or quadruple wheel rocker arms without having to open the endless tread links or chain links, respectively. For solving this task, the invention essentially consists in that at least one bearing bracket for the swivel axis of the rocker arms is removably connected with an endless tread carrier. On account of this measure, the dual wheel rocker arm or quadruple wheel rocker arm can laterally be dismounted without opening the track chain after having removed this bearing bracket. In this case and in a preferred manner, the removable bearing bracket is arranged at the outer side of the endless tread chassis, which improves accessibility in case of maintainance work.

The detachable connection of the bearing bracket with the endless tread carrier can, in a particularly advantageous manner, be realized if the removable bearing bracket has a flange essentially extending in parallel relation to the swivel axis of the rocker arm and being adapted to be connected with the endless tread carrier by means of screws and being bent off said bearing bracket or being welded thereto. In such an arrangement, the vertically acting supporting forces, which must be supported by the bearing bracket, are still acting on the endless tread carrier with interposition of the whole cross section of the bearing bracket, noting that the flange, which is oriented in substantially parallel relation to the swivel axis of the rocker arms, need only prevent lateral shifting movement of the bearing bracket in direction of the swivel axis of the rocker arms. The load of the connecting screws is kept low in such a construction.

In a particular advantageous manner, the arrangement is such that the swivel axis of the rocker arms is formed of a bolt, which is screwed with a nut at the outer side of the detachable bearing bracket and is supported in direction of the axis by a head on the inwardly facing outer side of the inner bearing bracket, noting that the bolt as well as the nut are, after having been positioned, secured in their rotated position. In this case, the nut can, in an advantageous manner, be designed as a keyed nut, noting that the rotated position can be secured by a locking member which can be welded onto the outer side of the detachable bearing bracket. For dismantling purposes, it is then sufficient to separate this locking member by means of an abrasing disc. The bolt itself must equally be secured against becoming rotated for the purpose of preventing that the bolt is unscrewed from the nut on account of the swivelling movement of the rocker arms. For this purpose, the head of the bolt may have on its circumference at least one flattened area cooperating with a corresponding locking member on the inner outer side of the inner bearing bracket, noting that this locking member may be formed of a web or the like mounted by welding.

BRIEF DESCRIPTION OF THE DRAWING

In the following, the invention is further explained with reference to an embodiment shown in the drawing.

In the drawing

DETAILED DESCRIPTION OF THE PREFERRED EMBODIMENT

Figure 1:
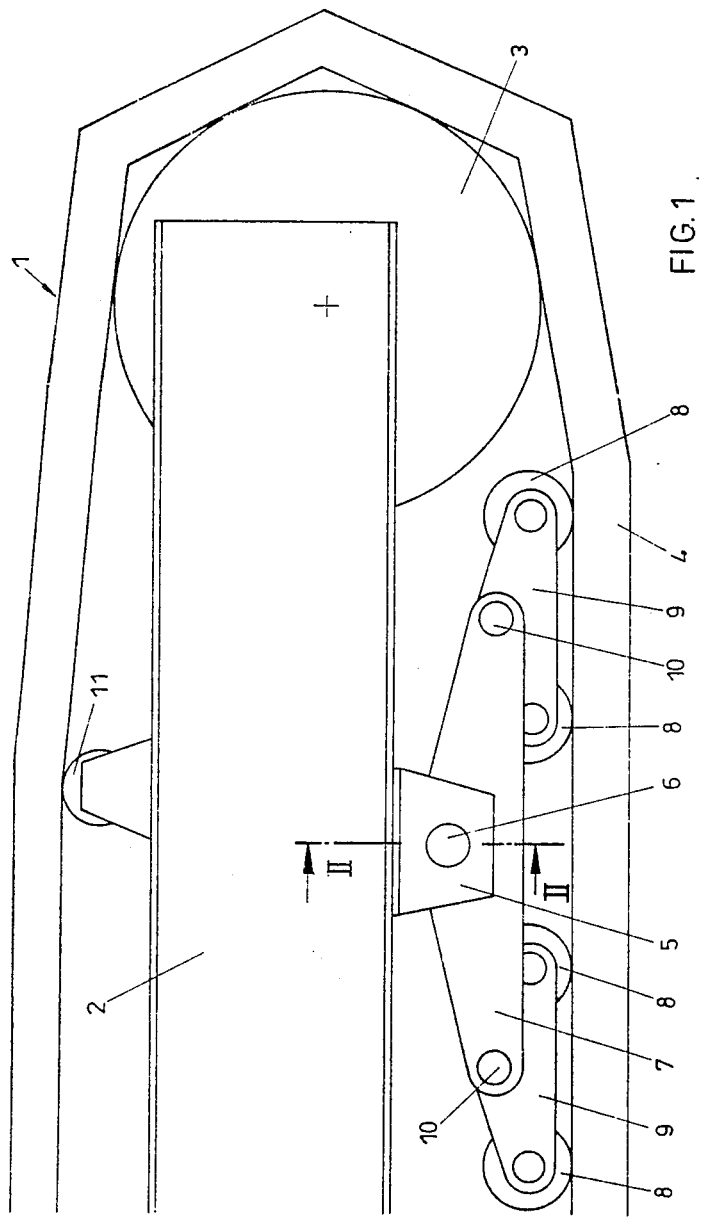
FIG. 1 shows a side elevation of a endless tread chassis comprising a quadruple wheel rocker arm.

In FIG. 1, there is shown a endless tread chassis 1, the carrier 2 of which carries a driving star 3 for the chain links 4 of the endless tread chassis. Bearing brackets 5 are fixed on the carrier 2 of the endless tread chassis and carry the pivot axis 6 of a quadruple wheel rocker arm 7, noting that a respective pair of running rollers 8 is supported in separate rocker arms 9 being swivellable around axes 10 within the quadruple wheel rocker arm 7.

The upper chain strand is supported on the carrier 2 of the endless tread chassis by means of stationary rollers 11, but can also be guided within sliding blocks.

Figure 2:
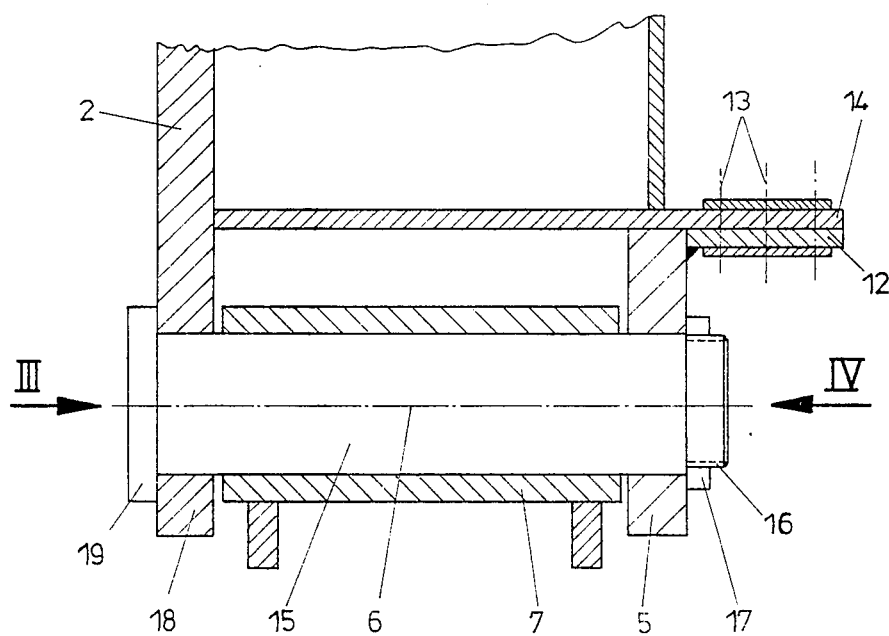
FIG. 2 shows in an enlarged scale a section along line II—II of FIG. 1.

FIG. 2 shows that the outer bearing bracket 5 of the swivel axis 6 for the rocker arm 7 has a flange 12 being oriented in parallel relation to the swivel axis 6 and being connected by means of screws 13 with a corresponding flange 14 of the carrier 2 of the endless tread chassis.

The swivel axis of the rocker arms 7 is formed of a bolt 15, which engages a keyed nut 17 by means of a thread 16. That end of the bolt 15, which extends through the inner bearing bracket 18, has a head 19. The bolt 15 is shifted through the inner bearing bracket 18 from the inner side and, after having tightened the keyed nut 17, the head 19 as well as the keyed nut 17 are secured against rotation. For securing the position the keyed nut 17, safety elements 20 are welded on the outer side of the detachable bearing bracket 5, said safety elements engaging a groove 24 of the keyed nut. This is again made more clear in FIG. 4.

Figures 3, 4:
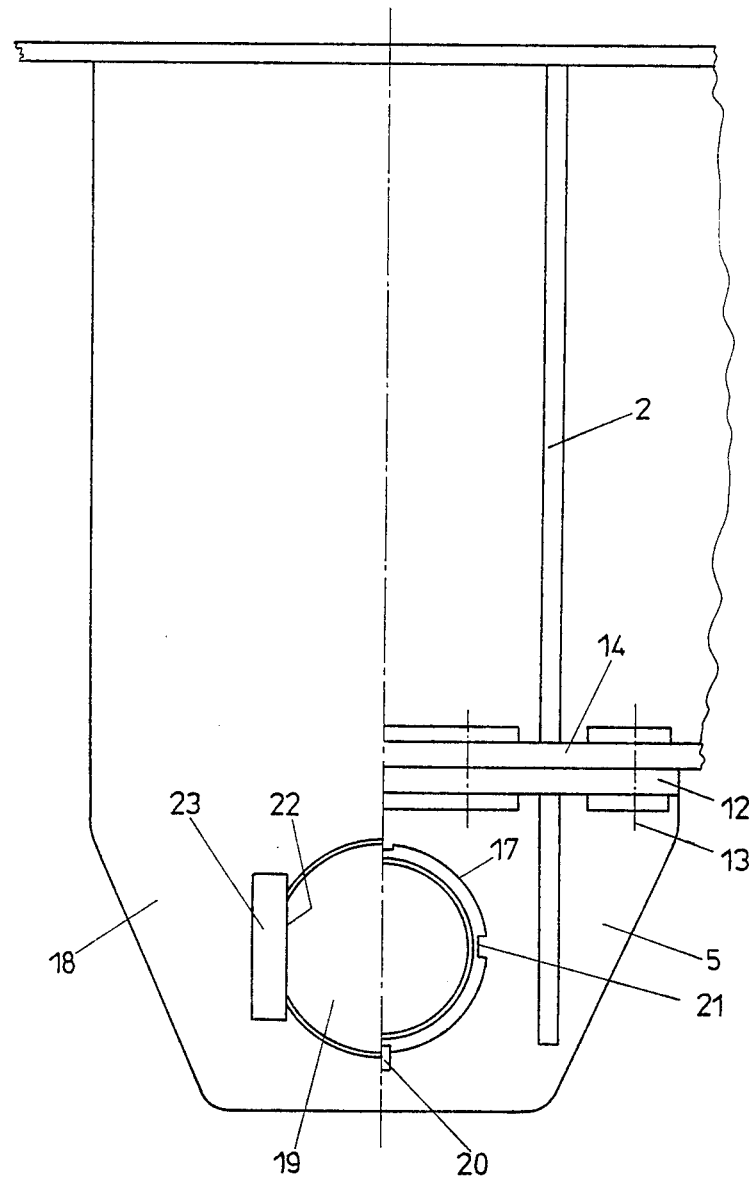
FIG. 3 shows a view in direction of the arrow III of FIG. 2
FIG. 4 shows a view in direction of the arrow IV of FIG. 2.

In FIG. 3 there is shown the means for securing the head 19 of the bolt 15 against becoming rotated. The head 19 has a flattened partial area 22 cooperating with a web 23 on the inner outer side of the bearing bracket 18.

Finally, there is shown in FIG. 4 the safety element 20 which is welded to the detachable bearing bracket 5 and engages a groove 21 of the keyed nut 17.

What is claimed is:

1. An endless-track chassis for a heavy duty vehicle comprising: an elongated carrier around which an endless track can be looped, at least one rocker arm pivotally connected to the carrier by means of an axle passing through a part of the carrier in a direction which is transverse to the long dimension of the carrier so that the rocker arm may pivot about an axis extending in said transverse direction, said rocker arm supporting rollers which engage the endless track; a bearing bracket located at the outer side of carrier and supporting an end portion of said axle, said outer bearing bracket having a flange extending parallel to said pivot axis and having a body having an upwardly facing horizontal surface abutting a downwardly facing horizontal surface on the carrier such that vertical forces transmitted to the bracket by the axle are transmitted to the carrier at said horizontal surfaces, and said flange engaging a complementary surface on a flange extending from the carrier; and removable fastening means detachably connecting said flanges together, whereby said outer bearing bracket can be detached from the carrier to permit the rocker arm to be removed from the carrier in a direction parallel to said axis, and whereby the flanges are not load bearing and, with the fastening means, need only prevent horizontal shifting of the bracket in the direction of said axis.

2. Endless tread chassis as in claim 1 including an inner bearing bracket carried by said carrier and wherein said axle is a bolt extending through said inner bearing bracket and through said body of said outer bearing bracket, said bolt having a threaded outer end threadedly engaging a nut located on the outside of said body and said bolt having an inner end in the form of a head which engages said inner bearing bracket.

* * * * *